United States Patent [19]

Salter, Jr.

[11] 4,099,731
[45] Jul. 11, 1978

[54] SEAL

[75] Inventor: Lowell S. Salter, Jr., Shrewsbury, Mass.

[73] Assignee: Morgan Construction Company, Worcester, Mass.

[21] Appl. No.: 749,937

[22] Filed: Dec. 13, 1976

Related U.S. Application Data

[63] Continuation of Ser. No. 620,438, Oct. 7, 1975, abandoned.

[51] Int. Cl.² ............................................. F16J 15/34
[52] U.S. Cl. ............................... 277/164; 277/235 R
[58] Field of Search ................................... 277/81–95, 277/58, 70, 164; 308/36, 1

[56] References Cited

U.S. PATENT DOCUMENTS

| | | | |
|---|---|---|---|
| 2,444,699 | 7/1948 | Hastings et al. | 277/89 |
| 2,868,574 | 1/1959 | Rich | 277/90 |
| 3,330,567 | 7/1967 | Mercer et al. | 277/164 |
| 3,545,774 | 12/1970 | Rickley | 277/164 |
| 3,832,021 | 8/1974 | Jennings | 277/58 |

Primary Examiner—Robert I. Smith
Attorney, Agent, or Firm—Thompson, Birch, Gauthier & Samuels

[57] ABSTRACT

A seal is disclosed for use on the neck of a rotatable roll in a rolling mill. The seal includes a flexible circular inner body segment adapted to be mounted in sealing engagement on the roll neck for rotation therewith, and a flexible circular outer body segment adapted to be mounted on the exterior surface of the inner body segment. The outer body segment has axially spaced resilient flanges extending radially outwardly therefrom. The inner and outer body segments, which may if desired be manufactured of different materials, are connected together in a manner which prevents rotation of one segment relative to the other segment, and which also preferably permits the outer body segment to be readily separated from the inner body segment. A reinforcing element may be associated with the outer body segment for the purpose of resisting centrifugal forces acting on the seal during rotation of the roll neck.

6 Claims, 2 Drawing Figures

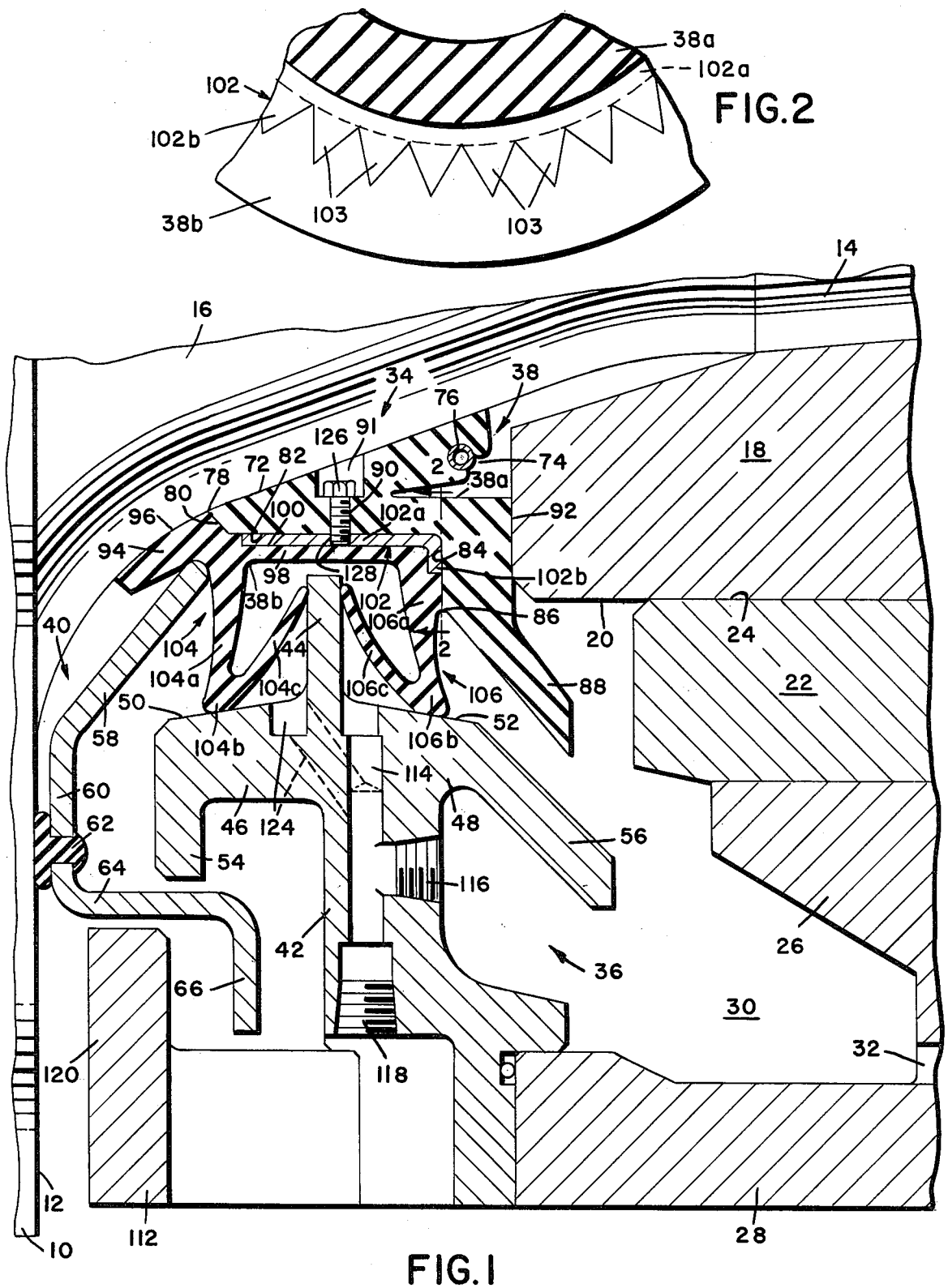

SEAL

This is a continuation, of application Ser. No. 620,438 filed Oct. 7, 1975 and now abandoned.

BACKGROUND OF THE INVENTION

This invention relates generally to the art of seals, and is concerned in particular with neck seals of the type employed on roll necks in rolling mills.

In a typical rolling mill installation, a roll neck is journalled for rotation in an oil film bearing. The bearing includes a sleeve keyed or otherwise fixed to the roll neck for rotation therewith. The sleeve is surrounded by and supported within a non-rotatable bushing which is in turn contained in a bearing chock. An oil film is maintained between the sleeve and the bushing during operation of the mill. A seal assembly is employed both to prevent loss of oil from the bearing, and also to prevent exterior contaminants such as cooling water, mill scale, etc. from penetrating into the bearing.

Typical of the prior art seal assemblies which have heretofore been developed are those described in U.S. Pat. Nos. 2,868,574; 3,093,425; 3,330,567; 3,545,774 and 3,832,021, all having been assigned to the same assignee as that of the present invention. These prior art seal assemblies each typically include a one-piece neck seal having a flexible circular body mounted on a tapered transition section of the roll neck, with resilient flanges which extend radially outwardly from the seal body. The peripheral edges of the resilient flanges are adapted to frictionally contact surrounding shoulders on a non-rotatable seal end plate. Oil is retained in the bearing by the seal provided at the interface between one of the rotating resilient seal flanges and the non-rotatable seal end plate shoulder in contact therewith. Likewise, contaminants are excluded from the bearing by the seal provided at the interface between the other of the rotating resilient seal flanges and its associated seal end plate shoulder.

Although the neck seals of these conventional seal assemblies have operated for many years in a generally satisfactory manner, there have been several problems associated with their use. For example, because the neck seals are molded as a single integral unit, when leakage occurs due to wear of the peripheral flange edges, the entire seal must be replaced. The replacement of entire seals when only their flanges are worn represents an unnecessary expense to mill owners.

Also, because conventional seals are molded as a single unit, the same flexible material must be used for all portions of the seal. However, the ideal material for the resilient flanges may not be suitable for the body portion which must sealingly engage the roll neck. Thus a compromise usually must be made when selecting a single material which is acceptable for all sections of the seal. Such compromises prevent the seal manufacturer from using the best available material for the seal flanges, and thus limit the useful life of the seal to something less than it might otherwise be if the manufacturer had more latitude in the selection of available materials.

Another problem with conventional one-piece seals relates to the difficulty of accurately locating reinforcing elements such as metal bands in the seal body.

Accordingly, a general object of the present invention is to provide a novel and improved seal which obviates or at least substantially minimizes the problems mentioned above.

A more specific object of the present invention is the provision of a seal comprised of separately manufactured inner and outer flexible body segments.

A further object of the present invention is the provision of a seal having inner and outer flexible body segments which are separately manufactured of different materials, with the material for the outer body segment being ideally suited for providing long-wearing resilient flanges, and with the material for the inner body segment being ideally suited for mounted on the roll neck in sealing engagement therewith.

A still further object of the present invention is the provision of a seal comprised of separately manufactured inner and outer flexible body segments interconnected in a manner which permits replacement of a worn outer body segment without also having to replace the inner body segment.

Another object of the present invention is to provide a seal comprised of inner and outer flexible body segments, with a reinforcing element such as for example a metallic band integral with the outer body segment.

SUMMARY OF THE INVENTION

According to the present invention there is provided an improved seal which includes a flexible inner body segment adapted to be mounted in sealing engagement on a roll neck for rotation therewith, and a flexible outer body segment adapted to be mounted on the exterior surface of the inner body segment. The outer body segment has axially spaced resilient flanges extending radially outwardly therefrom. The inner and outer body segments, which preferably although not necessarily can be manufactured of different materials, are connected together in a manner which prevents rotation of one body segment relative to the other body segment, and which also preferably permits the outer body segment to be readily separated from the inner body segment. A reinforcing element may be associated integrally with the outer body segment for the purpose of resisting centrifugal forces acting on the seal during rotation of the roll neck.

This improved seal embodies a number of advantages which have heretofore not been available with prior art seals. For example, the outer body segment can be manufactured of a material which is ideally suited to provide long wearing resilient flanges, whereas the inner body segment can be manufactured of a different material which is ideally suited for mounting in sealing engagement on the roll neck. The separability of the outer body segment from the inner body segment is advantageous in that it allows the outer body segment to be replaced when its flanges become worn without also having to replace the inner body segment. Also, by subdividing the seal into inner and outer body segments, the task of accurately locating a reinforcing element such as for example a metal band is considerably simplified.

BRIEF DESCRIPTION OF THE DRAWINGS

Several embodiments of the invention will now be described by way of example only, with reference to the accompanying drawings wherein:

FIG. 1 is a sectional view of a seal assembly incorporating a neck seal embodying the concepts of the present invention; and, FIG. 2 is a sectional view taken along line 2—2 of FIG. 1.

DESCRIPTION OF PREFERRED EMBODIMENT

Referring initially to FIG. 1, a roll is shown at 10 having an end face 12 and a roll neck 14 connected to the roll 10 by an intermediate tapered transition section 16. The roll neck 14 has mounted thereon a sleeve 18 having a cylindrical outer bearing surface 20. The sleeve 18 is fixed to the roll neck 14 by conventional means, for example a key (not shown). Sleeve 18 is journalled for rotation in a fixed bushing 22 having an interior cylindrical bearing surface 24. The bushing 22 is carried within and fixed relative to a roll chock 26. It will thus be seen that sleeve 18 rotates with the roll, while the chock 26 and the bushing 22 are stationary. Oil in flooding quantity is fed continuously between the bearing surfaces 20 and 24. A circular extension 28 of the roll chock 26 provides at its bottom portion a sump 30 in which the oil emerging from the bearing is continuously collected. The oil is drawn away from the sump through a suitable piping connection 32 to be recycled in a conventional manner back to the bearing surfaces.

During operation of the mill, a liquid coolant is continuously flooded over the roll 10 and down over the face 12. The coolant normally picks up particulate matter such as dirt, mill scale, etc. The liquid coolant, mill scale, dirt, etc. will hereinafter be collectively referred to as "contaminants". In spite of the centrifugal forces which tend to throw the contaminants off of the rotating surfaces of the roll, some of the contaminants tend to flow along the roll neck in the direction of the bearing. Accordingly, a seal assembly generally indicated at 34 is employed for the dual purpose of retaining the lubricating oil in the bearing, and also for preventing the contaminants from penetrating into the bearing.

In the embodiment herein being employed for illustrative purposes, the seal assembly 34 is made up of the three principal components, i.e., a circular seal end plate 36; a neck seal 38, and an inner seal ring 40. The seal end plate 36 is fixed to the circular extension 28 of the chock 26 and is thus held in a non-rotatable relationship relative to the roll 10. Seal end plate 36 has an annular body 42 and an inwardly extending rigid radial flange 44. Other flanges 46, 48 provide shoulders 50, 52 which extend in opposite directions from the base of flange 44. Flange 46 has a radially outwardly extending extension 54, and flange 48 likewise has an angularly disposed extension 56.

The inner seal ring 40 consists of a conical inner part 58, an annular part 60 which engages the end face 12 of the roll through a series of interposed angularly separated spacers 62, and a generally cylindrical part 64 terminating in a radial flange 66.

The components thus far described are conventional and well known to those skilled in the art. The present invention resides in the neck seal 38 which is employed in conjunction with the seal end plate 36 and the inner seal ring 40.

Neck seal 38 is comprised basically of an assembly of a circular flexible inner body segment 38a and a circular flexible outer body segment 38b. The body segments 38a, 38b are manufactured separately, as by molding, extrusion or by any other known technique. Inner body segment 38a has an inner conical surface 72 adapted to be mounted on the transition section 16 of the roll neck in sealing engagement therewith. If desired, a groove 74 can be provided to receive a garter spring 76 or other like retaining element to assist in holding the inner body segment against the surface of the roll neck. Beginning at one end 78 of the inner body segment 38a, there is provided an angular end face 80 leading to an outer cylindrical surface 82 which is arranged coaxially with the seal axis. The outer cylindrical surface 82 extends to a perpendicular face 84 which extends radially outwardly to a shoulder 86 at which an exterior conical flange or "flinger" 88 joins the inner body segment 38a. Flinger 88 is radially spaced from and generally parallel to the extension 56 on the seal end plate 36. The inner body segment 38a is further provided with a plurality of radial holes 90, each having a countersunk portion 91 adjacent to the inner surface 72. The end face on the inner body segment 38a sealingly engages one end of the sleeve 18 as at 92.

The outer body segment 38b includes an end flange 94 which forms a general extension of the inner body segment 38a, and which also has an inner surface 96 in sealing engagement with the transition section 16 of the roll neck. Outer body segment 38b further includes a generally tubular section 98 having a cylindrical outer surface and an interior surface which forms a circular groove 100 adapted to receive a reinforcing element such as for example an L-shaped metallic band 102. Referring additionally to FIG. 2, it will be seen that band 102 has an annular body section 102a terminating at one end in a perpendicular flange 102b, with the body section 102a and flange 102b being respectively coaxial and perpendicular to the axis of the seal. The end flange 102b is cut away or relieved to provide a generally serrated configuration with teeth 103. This end flange configuration enables the band 102 to be flexed with the outer body segment 38b. Seal material fills the gaps between the teeth 103, thereby providing a better mechanical connection between the band 102 and outer body segment 38b. During the manufacturing step, the outer body segment 38b and the reinforcing band 102 are intimately and permanently bonded together.

The outer body segment 38b is additionally provided at opposite ends of the tubular section 98 with a pair of axially spaced resilient outer flanges 104 and 106. The flanges 104, 106 are each comprised of first annular sections 104a, 106a which extend radially outwardly from the tubular section 98 to intermediate peripheral shoulders 104b, 106b, and with second annular sections 104c, 106c which extend from the aforesaid peripheral shoulders inwardly back towards the tubular section 98. The peripheral shoulders 104b, 106b are in frictional contact with the shoulders 50, 52 of the seal end plate 36, and the inner edges of the second annular sections 104c, 106c are in frictional contact with the sides of the radial flange 44 of the seal end plate. This flange design and the advantages to be derived therefrom are more fully described and claimed in a copending application being filed concurrently herewith.

It will be understood, however, that the present invention is not limited to seals which have a resilient flange configuration as shown in the drawings. The concepts of the present invention can be applied equally advantageously to prior art seal configurations of the type described in the above-mentioned patents.

The operation of the seal assembly 34 will now be explained. The rotatable components include the roll 10 and its neck portions 14, 16, together with the sleeve 18, neck seal 38 and inner seal ring 40. The non-rotatable components include the bushing 22, chock 26, seal end plate 36 and an outer seal ring 112 attached to the seal end plate 36. With reference initially to the "bearing side" of the seal, it will be understood that oil is constantly being expelled from between the bearing surfaces 20, 24. Some of the expelled oil will simply fall by gravity or run down the stationary walls of the fixed parts into the sump 30. Some of the expelled oil will be contacted by the rotating third flange 88 on the neck seal 38 and directed into the sump. However, some of the expelled oil will eventually work its way out along flange 56. A major portion of this oil will be turned back by the seal provided at the interface between the rotating peripheral shoulder 106b and the stationary shoulder 52. Some oil may succeed in passing beneath shoulder 106b to continue along shoulder 52 and thence along flange 44. The second sealing surface provided between the inner edge of annular section 106c and the side of flange 44 will prevent this oil from continuing along flange 44. Any oil reaching this point will be turned back and collected temporarily in a chamber formed between the flange 44, shoulder 52 and the annular section 106c of resilient flange 106. A drain 114 in the seal end plate 36 communicates with the aforesaid chamber and with ports 116 and 118. Port 118 can be used to monitor the bearing to determine whether any leakage is being experienced at the seal interface between shoulders 106b and 52. If port 118 is plugged, then any such leakage will simply be returned via port 116 to the sump 30.

On the "roll side" of the seal, the contaminants are for the most part thrown off by centrifugal force. A major portion of any such contaminants which succeed in passing by the flange (120 on outer seal ring 112) will be thrown off by radial flange 66 to be ultimately discharged through a drain 122. If some contaminants do succeed in reaching the inner concave side of the inner sealing ring 40, then the contact area between rotating peripheral shoulder 104b and stationary shoulder 50 will provide a first sealing barrier. A second sealing barrier will again be provided at the interface between the rotating inner edge of annular section 104c and the side of stationary flange 44. Any contaminants turned back by this second sealing interface will be temporarily collected in a second chamber before being expelled through a separate drain 124 in the seal end plate 36.

As previously mentioned, the inner and outer body segments 38a, 38b are separately manufactured. It is thus possible to manufacture the inner body segment 38a of one flexible material which is particularly suited for mounting on the roll neck in sealing engagement therewith, and to manufacture the outer body segment 38b of a different material which is particularly suited to the formation of long lasting resilient flanges. Typically, both segments will be molded or extruded from a synthetic rubber-like material, with the material of the outer body segment being more dense and resilient than that of the inner body segment.

The inner and outer body segments 38a, 38b are interconnected in sealing engagement with each other in a manner which prevents rotation of one segment relative to the other segment. In the preferred embodiment employed herein for illustrative purposes, this is achieved by using machine screws 126 which extend radially outwardly through the holes 90 in the inner body segment 38a. The screw heads are located in the countersunk portions 91 of the holes 90, and the opposite ends of the screws are threaded into tapped holes 128 in the reinforcing band 102.

With this arrangement, when the flanges 104, 106 become worn, the outer body segment 38b can be replaced without the necessity of also having to replace the inner body segment 38a. The ability to replace only the segment of the seal which supports the worn flanges permits the mill owner to realize considerable savings.

It will of course be understood that the present invention is not limited to any particular manner of connecting the outer body segment 38b to the inner body segment 38a. Under certain circumstances, it may be acceptable to simply permanently adhere the two segments together by use of a suitable bonding agent. Other means, for example, specially designed clips or the like, might also be employed to removably connect the outer body segment 38b to the inner body segment 38a.

It will also be understood that the use of a reinforcing element such as the disclosed band 102 is also not a strict requirement of the present invention. Other types of reinforcing elements may be employed, for example those shown in U. S. Pat. Nos. 3,330,567 and 3,545,774. Under certain circumstances, it may be acceptable to simply omit the use of any reinforcing element.

It will, however, be appreciated that when a reinforcing element of the type shown in the drawings is to be employed, then its precise positioning with regards to other seal surfaces is considerably facilitated by the fact that the reinforcing element may for example be attached to one side of the mold used to manufacture the outer body segment 38b.

It is my intention to cover all changes and modifications to the embodiment herein chosen for purposes of disclosure which do not depart from the spirit and scope of the invention.

I claim:

1. In a rolling mill, for use in combination with a work roll having a roll neck rotatably supported by a bearing contained in a bearing chock, with a circular nonrotatable seal end plate surrounding and spaced radially from the roll neck at a location between the bearing chock and the roll end face, a neck seal assembly adapted to be mounted on the roll neck for rotation therewith within the confines of the seal end plate, said neck seal assembly comprising:
   (a) separately manufactured circular flexible inner and outer body segments;
   (b) said inner body segment being arranged radially within said outer body segment, with adjacent portions of said inner and outer body segments being in direct sealing engagement with each other;
   (c) means for connecting said body segments together and for preventing movement of one body segment relative to the other body segment;
   (d) interior surface means on said inner body segment for sealingly engaging the roll neck; and,
   (e) flanges integral with and extending radially from said outer body segment to frictionally engage the seal end plate.

2. The neck seal assembly as claimed in claim 1 further comprising circular metal reinforcing means intimately and permanently connected to said outer body segment for resisting centrifugal forces acting on said neck seal assembly during rotation of the roll neck.

3. The neck seal assembly as claimed in claim 2 wherein said circular metal reinforcing means is located at the interface between said inner and outer body segments.

4. The neck seal assembly as claimed in claim 3 wherein said circular metal reinforcing means is comprised of a cylindrical band, and wherein said means for connecting said body segments together is comprised of threaded holes in said metal band, said holes being suitably spaced for alignment with openings in said inner body segment, and screws extending through said openings for threaded engagement in said holes.

5. The neck seal assembly as claimed in claim 1 wherein said inner and outer body segments are manufactured of different materials.

6. A seal for use on the neck of a rotatable roll, said seal comprising: a flexible circular inner body segment mounted in sealing engagement on the roll neck for rotation therewith; a flexible circular outer body segment mounted on the exterior surface of said inner body segment in sealing engagement therewith, said outer body segment having axially spaced resilient flanges extending radially outwardly therefrom; a metal band interposed between said inner and outer body segments, said metal band having an L-shaped and cross-section with a tubular section coaxial with the seal axis and an end flange perpendicular to said axis; and means for connecting said body segments together in a manner which prevents rotation of one body segment relative to the other body segment.

* * * * *